United States Patent [19]

Holle

[11] 4,053,448

[45] Oct. 11, 1977

[54] POLYESTER BASED PATCHING COMPOSITION

[76] Inventor: Arthur William Holle, 8858 W. 47th St., Brookfield, Ill. 60513

[21] Appl. No.: 698,059

[22] Filed: June 21, 1976

[51] Int. Cl.$^2$ .......................... C08K 3/34; C08K 3/36
[52] U.S. Cl. .................................. 260/40 R; 260/863
[58] Field of Search .............................. 260/863, 40 R

[56] References Cited

U.S. PATENT DOCUMENTS

| | | | |
|---|---|---|---|
| 3,230,184 | 1/1966 | Alford | 260/40 R X |
| 3,763,084 | 10/1973 | Grudus et al. | 260/40 R X |
| 3,798,174 | 3/1974 | Acker et al. | 260/40 R |
| 3,844,995 | 10/1974 | Kloker et al. | 260/863 X |
| 3,873,475 | 3/1975 | Pechacek et al. | 260/40 R X |
| 4,009,145 | 2/1977 | Hunt | 260/863 |

*Primary Examiner*—Sandra M. Person
*Attorney, Agent, or Firm*—John J. Kowalik; Paul Shapiro

[57] ABSTRACT

Patching compositions suitable for repairing imperfections in metal surfaces, and particularly dented automobile bodies, are prepared from thermosetting unsaturated polyester resins having incorporated therein a minor amount of inorganic hollow microspheres and a major amount of a filler admixture containing silica and an alkaline inorganic powder having a pH greater than 7.

14 Claims, No Drawings

POLYESTER BASED PATCHING COMPOSITION

BACKGROUND OF THE INVENTION

1. Field of the Invention

This invention relates to thermosetting resinous compositions useful for filling metal cavities and, more particularly, to thermosetting unsaturated polyester resin compositions useful for patching dents in the surfaces of metal articles such as automobile vehicle bodies resulting from collisions.

2. The Prior Art

The use of thermosetting resinous materials as patching compositions for damaged or dented sheet metal is well known. For example, unsaturated polyester resinous compositions have been widely used for this purpose.

The unsaturated polyester resin materials upon which the patching compositions are based are usually solutions of unsaturated polyesters in a polymerizable monomeric solvent such as sytrene, vinyl toluene, acrylates and the like. The unsaturated polyester itself is usually formed by the esterification of glycols with dicarboxylic acids or acid anhydrides. At least a part of the dicarboxylic acid or acid anhydride contains ethylenic unsaturation, e.g. maleic acid, maleic anhydride and the like. Some of the dicarboxylic acid may be free of ethylenic unsaturation, e.g., phthalic acid, adipic acid and the like. The unsaturated polyester resin is dissolved in a polymerizable monomer to prepare the customary resinuous based compositions used in the trade. Usually 10 to 60 parts by weight of styrene and 40 to 90 parts by weight of the unsaturated polyester are mixed to formulate a typical resin binder for the thermosetting patching materials used to repair dented surfaces in damaged automobile bodies.

In preparing thermosetting patching materials using an unsaturated polyester resin binder, the art teaches incorporating an inorganic, mineral powder such as talc, clay or silica sand in the binder to impart impact and structural strength as well as workability to the resin composition.

The art, e.g., U.S. Pat. No. 3,230,184, further teaches that where high strength-to-waist ratios are required, that hollow glass spheres be also incorporated in the unsaturated polyester resin based patching formulation. U.S. Pat. No. 3,873,475 discloses incorporating a mixture of hollow microshperes and an inorganic filler powder in an unsaturated polyester resin to prepare a thermosetting resin formulation suitable as a metal patching material. According to the patent, the filler is incorporated in the polyester resin in major amounts, e.g., the total amount of filler particles incorporated in the polyester resin constitute one half to two thirds the total volume of the patching composition.

The mixture of thermosetting polyester resin binder and inorganic filler has the consistency of a paste. Immediately prior to application to a dented metal surface, the paste is mixed with a cross-linking catalyst such as benzoyl peroxide to accelerate hardening of the patching composition. At the time of application, the filled thermosetting polyester patching composition is partially gelled and thixotropic and can be formed and shaped to the configuration of the dent, and upon cure, the composition becomes a hardened thermoset mass of resin which is confined within the dent.

Metal surfaces of automobile bodies, household appliances and the like having dents, cracks or holes are conventionally repaired with inorganic filler modified thermosetting unsaturated polyester patching compositions in order to eliminate these imperfections. A satisfactory elmination of such imperfections involves subjecting the dents filled with the hardened patching composition to a finishing operation in order to obtain a smooth, uniform surface which blends with the metal surface being repaired so as to be indistinguishable from the rest of the metal surface after a coat of paint has been applied to the surface. Since this subsequent finishing operation is costly and time consuming, the provision of a filler modified unsaturated polyester resin which minimizes the time required for the finishing operation is of great importance. There is, therefore, a continuing interest and desire in the metal repair art, and particularly in the repair of damaged automobile bodies, for a patching composition which after application to a metal cavity or dent hardens rapidly and when hardened is readily susceptible to mechanical finishing procedures, particularly having good workability in the sense of being easily filed and readily sanded and good featherability, i.e., its ability to blend in with adjacent metal surfaces.

SUMMARY OF THE INVENTION

According to the practice of the present invention, there is provided a filled thermosetting polyester composition, particularly suitable for use in patching dented metal surfaces and susceptible to hardening at room temperature which composition comprises (1) a cross-linkable binder admixture of an unsaturated polyester resin and a vinylidene monomer solvent; (2) a filler admixture of silica and an alkaline inorganic filler having a pH greater than 7; and (3) hollow inorganic microspheres.

The relative proportions of the various ingredients contained in the patching composition may vary from about 35 about 55 percent by weight of the cross-linkable resin binder admixture, about 35 to about 55 percent by weight of the filler admixture and about 3 to about 10 percent by weight of the microspheres.

The proper selection of fillers, and especially the ratio of fillers used in the filler admixture is a critical and essential feature of the present invention. As will hereinafter be illustrated, it has been determined that a mixture of fillers of the type disclosed when used in certain ratios provide workability properties to the compositions of the present invention which cumulatively are superior to the use of each filler by itself.

PREFERRED EMBODIMENTS

The term "unsaturated polyester resin" as used herein refers to the well known class of cross-linkable polyester compounds derived by the condensation of unsaturated dibasic acids or anhydrides with dihydroxy compounds and may optionally include in the polymeric chain varying proportions of other saturated or aromatic dibasic acids and anhydrides which are not subject to cross-linking in order to reduce the degree of cross-linking of the hardened product. The particular non-cross-linking moieties and their proportions will depend upon the desired properties of the final products. Maleic acid, maleic anhydride, chloromaleic acid and fumaric acid are exemplary of unsaturated dibasic acids and anhydrides useful in preparing the unsaturated polyester resins used in the practice of the present invention. Maleic acid and its anhydride are the preferred unsaturated dibasic acid and anhydride used in the preparation of the unsaturated polyester resin.

Preferred aromatic and saturated acids and anhydrides which are exemplary of non-cross-linking moieties within the unsaturated polyester resin include phthalic anhydride, endomethylenetetrahydrophthalic acid, tetrachlorophthalic acid, hexachloroendomethylenetetrahydrophthalic acid, adipic acid, sebacic acid and succinic acid.

Any of a variety of well known di- and trihydroxy compounds can be used to produce the unsaturated polyester resins used in the practice of the present invention. Preferred hydroxy compounds, which are mentioned by way of example of the large number of applicable compounds include ethylene glycol, diethylene glycol, propylene glycol, dipropylene glycol, tetramethylene glycol, decamethylene glycol, polypropylene glycol, glycerol, 1,2-, 1,3- and 1,4- butadienols and trimethylol propane.

Cross-linking monomer diluents or solvents which are used in admixture with the unsaturated polyester resin in the practice of the present invention include polymerizable vinylidene compounds having at least one olefinic unsaturation. A wide variety of these monomers are known including both aliphatic and aromatic unsaturated hydrocarbons and hydrocarbon derivatives such as esters, acids and nitriles. Exemplary of these monomers are styrene, methyl styrene, acrylonitrile, methyl acrylate, methyl metacrylate, vinyl acetate and allyl esters of phtalic, adipic, maleic, malonic and pyromellitic acids.

Styrene is the preferred vinylidene monomer solvent used in admixture with the unsaturated polyester resin to prepare the thermosetting binder materials used in the practice of the present invention.

The quantity of vinylidene monomer used in admixture with the unsaturated polyester resin in the practice of the present invention is from about 10 to about 60% by weight based on the weight of the polyester, and about 25 to about 45% by weight of the vinylidene monomer is preferred. If more than one cross-linking vinylidene monomer is used as a solvent, it will usually be found that any desired proportions within this range can be utilized.

The practice of the present invention includes within its scope thermosetting biners prepared from one crosslinkable unsaturated polyester resin and one vinylidene monomer or a mixture of polyesters and vinylidene monomers.

The filler materials used in preparing the patching compositions of the present invention are incorporated in the patching composition in an amount ranging from about 35 to about 55 percent by weight based on the weight of the composition and preferably in the range of 40 to 50 percent by weight. A critical and essential feature of the present invention is that (1) the filler material is an admixture of silica and an alkaline inorganic filler having a pH greater than 7 and preferably a pH in the range of about 8.5 to about 10.5 and (2) the ratio of the silica filler to the alkaline inorganic filler in the admixture is in the range of about 3:1 to 1:3, and preferably in the range of about 2:1 to 1:2. Silicla, $SiO_2$ has a pH of 7.0. The filler ratios given above are by weight.

As will hereinafter be illustrated, the use of the admixture of fillers at the above-specified ratios results in thermosetting patching compositions of materially improved workability properties, and if these criteria are not followed, patching compositions of substantially inferior properties result.

The inorganic filler used in the practice of the present invention are preferably fine powders having an average particle size of less than 50 microns to facilitate blending and generally are in the range of 1 to 40 microns.

To obtain a patching composition having a low specific density, the specific gravity of the individual filler materials is desirably less than 4.

Amorphous silica is the preferred form of the silica component used in the filler admixture. Amorphous silica is available commercially from the Illinois Minerals Company. An amorphous silica product designated 1160 has been found particularly effective in the practice of the present invention. Amorphous silica 1160 is comprised of 99.5% $SiO_2$ and has the following physical properties:

| | |
|---|---|
| Specific gravity | 2.65 |
| pH | 7.0 |
| Particle Size | 92% below 40 microns |

The alkaline inorganic filler component of the filler admixture can be any inorganic powder having a pH greater than 7. Preferred filler materials in this second group of fillers are talc (magnesium silicate) and calcium carbonate. A talc product designated Vertal 95, available commercially from Vermont Talc Co., Inc., has been found effective when used with amorphous silica in the practice of the present invention. Vertal 95 is a platy talc having the following physical and chemical properties:

| Physical Properties | |
|---|---|
| Specific gravity | 2.9 |
| pH | 9.3 – 9.8 |
| Average Particle Size | 14.0 |
| Chemical Properties | |
| Component | % |
| MgO | 32.53 |
| $SiO_2$ | 37.24 |
| CaO | 0.76 |
| $Fe_2O_3$ | 1.31 |
| $Al_2O_3$ | 0.7 |
| Loss on Ignition | 20.3 |
| MgO - $SiO_2$ - CaO | 70.53 |
| $CO_2$ | 17.0 |

Commerically aviable calcium carbonate powders composed or irregular and uniaxial shaped particles having a pH of 9.3 and a mean particle size of 5.5 microns have also been found effective when used with amorphous silica in the practice of the present invention. Other filler materials having a pH greater than 7.0 which may be used in admixture with silica in the practice of the present invention include MgO (pH = 10.5), sodium sesquicarbonate (pH = 10.1) and sodium dimetaborate (pH = 9.2).

The unexpected properties of the patching compositions of the present invention appear to result from the use of the designated ratios of silica and the second inorganic filler having a pH greater than 7. If silica/alkaline inorganic filler ratios are outside the limits set above or the second inorganic filler does not have a pH greater than 7, the patching composition will not possess the unexpectedly superior properties of workability which render the compositions of the present invention so advantageous for patching and filling dents in metal surfaces.

The hollow inorganic microspheres incorporated in the patching compositions of the present invention generally have a density of less than 0.6 g/cc and the average diameter is generally less than 200 microns and preferably is 30 to 100 microns.

The hollow microspheres are incorporated in the patching composition in an amount ranging from about 3 to about 10 percent by weight based on the weight of the composition and preferably in the range of about 5 to about 8 percent by weight. The hollow microspheres act as a filler, but they also decrease the density of the patching composition while concomittantly increasing its strength.

The hollow inorganic microspheres used in the practice of the present invention are preferably glass microspheres or microbubbles, e.g., of the type disclosed in U.S. Pat. No. 3,365,315. The walls of these microbubbles are made by expanding solid glass particles at temperatures above 1000° C to form tiny hollow spheroids having an apparent density in the range of 0.14 to 0.38, a wall thickness of 0.5–2.0 microns and a particle size averaging 60 microns. Hollow glass microspheres are available commercially from the 3M Company. A glass microsphere product designated "B23/500" has been found effective in preparing patching compositions of the present invention. B23/500 has the following physical properties:

| | |
|---|---|
| Nominal density | 0.23 g/cc ± .03 |
| Nominal strength | 500 p.s.i. (at 10% collapse in isostatic pressure) |

Other suitable but less preferred glassy or inorganic microbubbles are made of sodium silicate, as for example as disclosed in U.S. Pat. No. 3,030,215, and heat expanded natural minerals such as perlite, volcanic ash, vermiculite, fly ash, having a density of about 0.6.

The compositions of the present invention should be thoroughly blended before use. The unsaturated polyester resin and vinylidene monomer may be blended and then the filler admixture and hollow microspheres are then added thereto with mixing. If desired, a small amount, e.g., 0.2 to 2 percent by weight of a pigment such as $TiO_2$, a dye or other colorant may be added to the mixture to serve as a guide to uniform mixing, i.e., when after mixing for a time the intensity of the colored pigment or dye in the mixture is observed to be at a minimum, uniform dispersion of the mixture components has been achieved.

Mixing may be done by hand but is more preferably done mechanically. Good mixing is essential, since to the extent that the mixing does not produce a uniform mixture, portions will have insufficient binder distributed over the surfaces of the filler admixture and microspheres thus producing weaker areas in the applied patching composition.

Immediately before the application of the patching composition to a damaged metal area, a small amount, e.g., about 0.5 to about 5 percent by weight of a cross-linking catalyst or accelerator is added to the patching composition. Typical cross-linking catalysts include organic peroxides such as benzoyl peroxide, cumyl peroxide and methyl ethyl ketone peroxide.

To repair a dent or hole in an automobile body, automobile fender or the like metallic surface, the filled unsaturated polyester patching composition and the catalyst components which are packaged in separate containers are blended together and the catalyst thoroughly dispersed throughout the composition at the time of use.

When the patching composition and the catalyst are brought together, the composition which is in the form of a paste will set and harden within 30 minutes, and the time or hardening can be varied by control of the quantity of catalyst used. A larger amount of catalyst speeds the hardening time. In this paste form the composition of the present invention is easy to apply since it has good adhesion to metal, will spread easily and retains a given shape very well. There is substantially no shrinkage or expansion during hardening.

The catalyzed patching composition will gel within 3 minutes after application. Within 10 minutes of application, the composition will have hardened to the extent that it can be subjected to mechanical working such as filing and within 15 minutes, the hardened mass may be sanded to blend with the surface around the damaged portion of the metal article being repaired, i.e., feathered and provide a smooth surface that can be readily finished by painting.

The following examples, in the opinion of the inventor, represent the best mode of carrying out his invention.

EXAMPLE I

A series of polyester patching compositions suitable for use in filling dents in metal panels of automobile bodies was prepared using as the binder a mixture of a commmercial polyester resin product containing the reaction product of 1 mole maleic anhydride, 3 moles phthalic anhydride and 4 moles of diethylene glycol, dispersed in styrene, the weight ratio of polyester of styrene being 70:30. The binder constituted 42.0 percent by weight of the patching composition. The compositions which were pastes at room temperature also contained 7.0 percent by weight B23/500 hollow glass microspheres and 1.0 percent by weight $TiO_2$ pigment. Varying amounts of amorphous silica 1160 and talc (Vertal 95) were then added as the filler component.

Benzoyl peroxide, at a concentration of 4 percent by weight, based on the weight of the patching composition, was added to the composition and was uniformly dispersed in the composition. The catalyzed composition was allowed to stand to determine the time required for the patching composition to gel to a degree that the patching composition was sufficiently thixotropic to be applied to a metal surface. Generally, a short gel time in the order of 2.5–5.0 minutes is preferred in the automobile body repair trade.

The patching compositions were than applied, by means of a plastic spreader, to curved (2°) steel panels of the type used in the fabrication of automobile finders in layers having a thickness of about 3/16 inches.

The patching compositions applied to the steel panels were then rated for adhesion, fileability, sandability and paintability.

Adhesion is a measure of whether the patching composition, after 7 minutes have elapsed from the time of catalyst addition, will harden sufficiently and become firmly bonded to the metal surface being repaired. Adhesion is rate "Excellent" if the patching composition applied to metal surface is not peeled, stripped or otherwise removed from the metal surface when the composition is hand filed, after the 7 minutes time lapse, with a file conventionally used by automobile body repair men. Adhesion of the patching composition is rated "Good" if a small amount of patching composition is removed by the file after the 7 minute time lapse and is rated "Poor" if a major portion of the applied patching composition is removed.

Fileability is a measure of the ease of hand filing the hardened patching composition. If the hardened patching composition is soft and pliable enough to be hand filed easily after 7–14 minutes have elapsed from catalyst addition, the fileability of the patching composition is rated "Excellent". If the hardened patching composition after the indicated time lapse can be filed only with difficulty, the fileability is rate "Good" and if the hardened patching composition cannot be filed after the time lapse, the fileability is rated "Poor".

Sandability is a measure of whether or not the patching composition applied to the dent can be sanded to trade specifications after 12–20 minutes have elapsed from the time of catalyst addition to the patching composition. Sandability is rated "Excellent" if the sandpaper used in the sanding operation does not become plugged with patching composition, the hardened composition can be sanded with relative ease and the composition feathers well without any portion thereof fraying or breaking off from the main portion of the hardened mass of thermoset patching material. Sandability is rate "Good" if the sandpaper used in sanding the hardened patching composition becomes partially plugged with thermoset composition. Sandability is rated "Poor" if the sandpaper becomes excessively plugged with patching composition and the hardened composition does not feather well.

Paintability is a measure of appearance of the hardened composition after sanding. If the sanded composition has a surface which is free of blisters and pinholes, the paintability is rated "Excellent". If the sanded surface contains some blisters and pinholes, the paintability of the patching composition is rated "Good", and if the sanded surface is excessively blistered and pinholed, the paintability of the composition is rated "Poor".

The results of the physical tests for adhesion, fileability, sandability and paintability recorded for the series of polyester patching compositions are summarized in Table I below.

For purposes of comparison, the procedure of Example I was repeated with the exception that fillers and filler admixtures outside the scope of the present invention were substituted for the filler admixtures used to prepare the polyester compositions of Example I. These comparative compositions, designated by the symbol "C", were also tested for adhesion, fileability, sandability and paintability, and the results of these comparative tests are also recorded in Table I below.

TABLE I

| Composition No. | Filler Admixture Silica % | Filler Admixture Talc % | Gel Time (Minutes) | Adhesion Rating | Fileability Rating | Physical Tests Elapsed Time (Minutes) | Sandability Rating | Elapsed Time (Minutes) | Paintability Rating |
|---|---|---|---|---|---|---|---|---|---|
| 1 | 33.0 | 17.0 | 2.5 | Good-Excellent | Good-Excellent | 7 | Good-Excellent | 12 | Excellent |
| 2 | 25.0 | 25.0 | 2.5 | Excellent | Excellent | 7 | Excellent | 12 | Excellent |
| 3 | 17.0 | 33.0 | 4.5 | Good | Good | 10 | Good | 14 | Good |
| $C_1$ | 8.0 | 42.0 | 5.0 | Poor | Poor | 12 | Poor | 20 | Poor |
| $C_2$ | 42.0 | 8.0 | 2.5 | Poor | Poor | 7 | Poor | 12 | Excellent |
| $C_3$ | 50.0 | 0 | 2.5 | Poor | Poor | 14 | Poor | 20 | Excellent |
| $C_4$ | 0 | 50.0 | 5.5 | Poor | Poor | 14 | Poor | 20 | Poor |
| $C_5$ | 46.0 | 4.0 | 2.5 | Poor | Poor | 7 | Poor | 12 | Excellent |
| $C_6$ | 4.0 | 46.0 | 5.5 | Poor | Poor | 14 | Poor | 20 | Poor |

EXAMPLE II

A second series of polyester patching compositions were prepared following the procedure of Example I with the exception that $CaCO_3$ powder composed or irregular and uniaxial shaped particles having a pH of 9.3 and a mean particle size of 5.5 was substituted for the Vertal 95. The patching compositions containing the filler admixture of silica and $CaCO_3$, prepared in accordance with the practice of the present invention, had physical properties substantially identical to the patching composition of Example I.

The results of the physical tests for adhesion, fileability, sandability and paintability recorded for the series of polyester patching compositions of Example II are summarized in Table II below.

For purposes of comparison, the procedure of Example II was repeated with the exception that fillers and filler admixtures outside the scope of the present invention were substituted for the filler admixtures used to prepare the polyester compositions of Example I. These comparative compositions were subjected to the same physical tests as the patching compositions of Example II. The results of these physical tests indicate that the comparative compositions have substantially inferior physical properties when compared to the patching compositions of Example II. The results of the comparative tests are also recorded in Table II. The comparative compositions are designated by the symbol "C".

TABLE II

| Composition No. | Filler Admixture Silica % | Filler Admixture $CaCO_3$ % | Gel Time (Minutes) | Adhesion Rating | Fileability Rating | Physical Tests Elapsed Time (Minutes) | Sandability Rating | Elapsed Time (Minutes) | Paintability Rating |
|---|---|---|---|---|---|---|---|---|---|
| 4 | 33.0 | 17.0 | 2.5 | Good-Excellent | Good-Excellent | 7 | Good-Excellent | 12 | Excellent |
| 5 | 25.0 | 25.0 | 2.5 | Excellent | Excellent | 7 | Excellent | 12 | Excellent |
| 6 | 17.0 | 33.0 | 4.5 | Good | Good | 10 | Good | 14 | Good |
| $C_7$ | 8.0 | 42.0 | 5.0 | Poor | Poor | 12 | Poor | 20 | Poor |
| $C_8$ | 42.0 | 8.0 | 2.5 | Poor | Poor | 7 | Poor | 12 | Excellent |
| $C_9$ | 50.0 | 0.0 | 2.5 | Poor | Poor | 14 | Poor | 20 | Excellent |
| $C_{10}$ | 0.0 | 50.0 | 5.5 | Poor | Poor | 14 | Poor | 20 | Poor |
| $C_{11}$ | 46.0 | 4.0 | 2.5 | Poor | Poor | 7 | Poor | 12 | Excellent |

TABLE II-continued

| Composition No. | Filler Admixture Silica % | Filler Admixture CaCO$_3$ % | Gel Time (Minutes) | Adhesion Rating | Fileability Rating | Physical Tests Elapsed Time (Minutes) | Sandability Rating | Elapsed Time (Minutes) | Paintability Rating |
|---|---|---|---|---|---|---|---|---|---|
| C$_{12}$ | 4.0 | 46.0 | 5.5 | Poor | Poor | 14 | Poor | 20 | Poor |

What is claimed is:

1. A thermosetting patching composition for the filling of dents, holes and similar imperfections in metal surfaces comprised of (1) about 35 to about 55 percent by weight of a binder component comprised of a mixture of an unsaturated polyester resin and a vinylidene monomer solvent copolymerizable with the polyester; (2) about 35 to about 55 percent by weight of a filler component comprised of an admixture of silica and an alkaline inorganic powder having a pH greater than 7, the silica and the alkaline inorganic powder being present at a weight ratio ranging from 1:3 to 3:1 and (3) about 3 to about 10 percent by weight of inorganic hollow microspheres.

2. The composition of claim 1 wherein the unsaturated polyester resin is the reaction product of maleic anhydride, phthalic anhydride and diethylene glycol.

3. The composition of claim 1 wherein the vinylidene monomer is present in the composition in an amount ranging from about 10 to about 60 percent by weight based on the weight of the polyester.

4. The composition of claim 3 wherein the vinylidene monomer is styrene.

5. The composition of claim 1 wherein the filler admixture contains silica and the alkaline inorganic powder at a weight ratio ranging from 1:2 to 2:1.

6. The composition of claim 5 wherein the silica is amorphous silica.

7. The composition of claim 5 wherein the alkaline inorganic powder is magnesium silicate.

8. The composition of claim 5 wherein the alkaline inorganic powder is CaCO$_3$.

9. The composition of claim 5 wherein the pH of the alkaline inorganic powder ranges from about 8.5 to about 10.5.

10. The composition of claim 5 wherein the particle size of the filler particles ranges from about 1 to about 40 microns.

11. The composition of claim 1 wherein the inorganic hollow microspheres are glass microspheres.

12. The composition of claim 11 wherein the microspheres have diameters in the range of 30 to 100 microns and densities in the range of 0.14 to 0.38.

13. The composition of claim 1 wherein about 0.5 to about 5.0 percent by weight of a cross-linking catalyst is incorporated in the composition.

14. The composition of claim 13 wherein the cross-linking catalyst is benzoyl peroxide.

* * * * *